(12) United States Patent
Uchida (10) Patent No.: US 11,537,336 B2
(45) Date of Patent: Dec. 27, 2022

(54) RESOURCE SERVICE SYSTEM, CONTROL METHOD, AND STORAGE MEDIUM

(71) Applicant: CANON KABUSHIKI KAISHA, Tokyo (JP)

(72) Inventor: Momoe Uchida, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/232,918

(22) Filed: Apr. 16, 2021

(65) Prior Publication Data

US 2021/0232348 A1     Jul. 29, 2021

Related U.S. Application Data

(63) Continuation of application No. 16/787,622, filed on Feb. 11, 2020, now Pat. No. 11,003,400.

(30) Foreign Application Priority Data

Feb. 20, 2019 (JP) .............................. JP2019-028392

(51) Int. Cl.
*G06F 3/12*     (2006.01)
*G16Y 20/30*     (2020.01)

(52) U.S. Cl.
CPC ............ *G06F 3/122* (2013.01); *G06F 3/1267* (2013.01); *G06F 3/1274* (2013.01); *G16Y 20/30* (2020.01)

(58) Field of Classification Search
CPC ...... G06F 3/122; G06F 3/1267; G06F 3/1274; G16Y 20/30
USPC ........................ 358/1.15, 1.9, 1.16, 444, 401
See application file for complete search history.

(56) References Cited

U.S. PATENT DOCUMENTS

| | | | |
|---|---|---|---|
| 9,654,501 B1 | 5/2017 | Ast | |
| 2016/0117134 A1* | 4/2016 | Sasaki | G06F 3/1296 358/1.15 |
| 2018/0060595 A1* | 3/2018 | Olds | G06F 3/1238 |

FOREIGN PATENT DOCUMENTS

| | | | |
|---|---|---|---|
| JP | 2001306511 A | 11/2001 | |
| JP | 2002247114 A | 8/2002 | |

* cited by examiner

*Primary Examiner* — Quang N Vo
(74) *Attorney, Agent, or Firm* — Canon U.S.A., Inc. IP Division (57) ABSTRACT

A resource service system is one of a plurality of resource service systems each capable of communicating with a reception service system that receives data from a plurality of clients. The resource service system acquires data from a first queue that receives and stores data transmitted from the reception service system, and processes the acquired data. In a case where it is determined a number of pieces of data of a predetermined client transmitted from the reception service system per unit time exceeds a first predetermined number, the resource service system sets a first setting for preventing the reception service system from transmitting the data of the predetermined client to the first queue.

10 Claims, 9 Drawing Sheets

```
{
    "time": "2018-08-31T12:00+09:00", ~401
    "topic": "clientErr", ~402
    "device_id": "123456789", ~403
    "data": "STREAM DATA" ~404
}
```
400

RESOURCE SERVICE SYSTEM, CONTROL METHOD, AND STORAGE MEDIUM

CROSS-REFERENCE TO RELATED APPLICATIONS

The present application is a continuation of U.S. patent application Ser. No. 16/787,622, filed on Feb. 11, 2020, which claims priority from Japanese Patent Application No. 2019-028392 filed Feb. 20, 2019, which are hereby incorporated by reference herein in their entireties.

BACKGROUND

Field

The present disclosure relates to a resource service system, a control method, and a storage medium.

Description of the Related Art

In recent years, a system for implementing "Internet of Things" (hereinafter, referred to as IoT) that connects, for example, home electric appliances and automobiles as client terminals to the Internet has been made available. Multifunctionalization of image forming apparatuses has progressed, and a multifunctional peripheral (hereinafter, referred to as MFP) can also serve as an IoT client. An IoT system collects and analyzes an enormous amount of data, which can include, for example, information about a sensor connected to the client, thus providing services and added value to the IoT client and a user using the IoT client.

The IoT system receives the above-described enormous amount of data from a large number of IoT clients (also simply referred to as clients). In such a process, in which data is received and processed in real time, an enormous amount of traffic which varies every moment can occur. It can be difficult for a resource server including an existing application programmable interface (API) to singlehandedly receive the enormous amount of data contained in such traffic. Accordingly, to collect the data, a reception service dedicated to stream processing (also simply referred to as reception service) can be used, and processing that provides a service (referred to as resource service) can be separated out as asynchronization processing. Such techniques are becoming common. Each of the IoT clients transmits data to the stream reception service, and the stream reception service buffers the data and supplies the data from the buffer in response to a data reception request from the resource service. The resource service can thus dedicate itself to data processing without needing to consider the enormous amount of varied traffic received from the IoT clients.

A plurality of resource services to which data is transferred from the stream reception service can be present. The resource services perform processing in asynchronization with the stream reception service. Thus, in development of the IoT system, a resource service can flexibly be added for each type of service to be provided.

In some cases, a client transmits data about an error to the reception service more frequently, that is, with a higher frequency than a normal frequency, due to, for example, a failure of a hard disk. Even in such a case, the reception service receives the data without considering a load of the resource service, and the resource service asynchronously continues the data processing as long as the data is present in the reception service. On the other hand, the data amount processable by the resource service per unit time is limited.

Accordingly, if a client transmits a large amount of data with a frequency higher than the normal frequency, the amount of data to be processed by the resource service increases, which can cause a delay in processing of data from other normal clients.

Japanese Patent Application Laid-Open No. 2015-088130 discuses a method for controlling the amount of data to be transmitted by causing a monitoring apparatus, which relays data transmission from a client to a management system, to delete part of the data to be stored and then transmit the remaining data to the management system; however, the method cannot solve the above-described issues.

SUMMARY

Various embodiments of the present disclosure are directed to providing a mechanism, in the processing in the resource service system, for preventing a delay in processing of data from clients other than a predetermined client that transmits a large amount of data.

A resource service system according to various embodiments of the present disclosure is one of a plurality of resource service systems, each capable of communicating with a reception service system that receives data from a plurality of clients.

The resource service system implements a first queue configured to hold data transmitted from the reception service system. The resource service system acquires data from the first queue, the data transmitted from the reception service system, and processes the acquired data. In a case where it is determined a number of pieces of data of a predetermined client transmitted from the reception service system per unit time exceeds a first predetermined number, the resource service system sets a first setting for preventing the reception service system from transmitting the data of the predetermined client to the first queue.

Further features will become apparent from the following description of exemplary embodiments with reference to the attached drawings.

DESCRIPTION OF THE EMBODIMENTS

Some exemplary embodiments of the present disclosure will be described below with reference to accompanying drawings.

A first exemplary embodiment of the present disclosure will be described below. In the present exemplary embodiment, applications are installed in individual servers on a network. The applications each cooperate with a client terminal and provide various functions. An entity providing such functions is referred to as a service, and providing of the functions to the client terminal is referred to as providing of the service. A service that is provided by linking a plurality of services from a plurality of servers and a plurality of applications is referred to as an integrated service.

Figure 1:
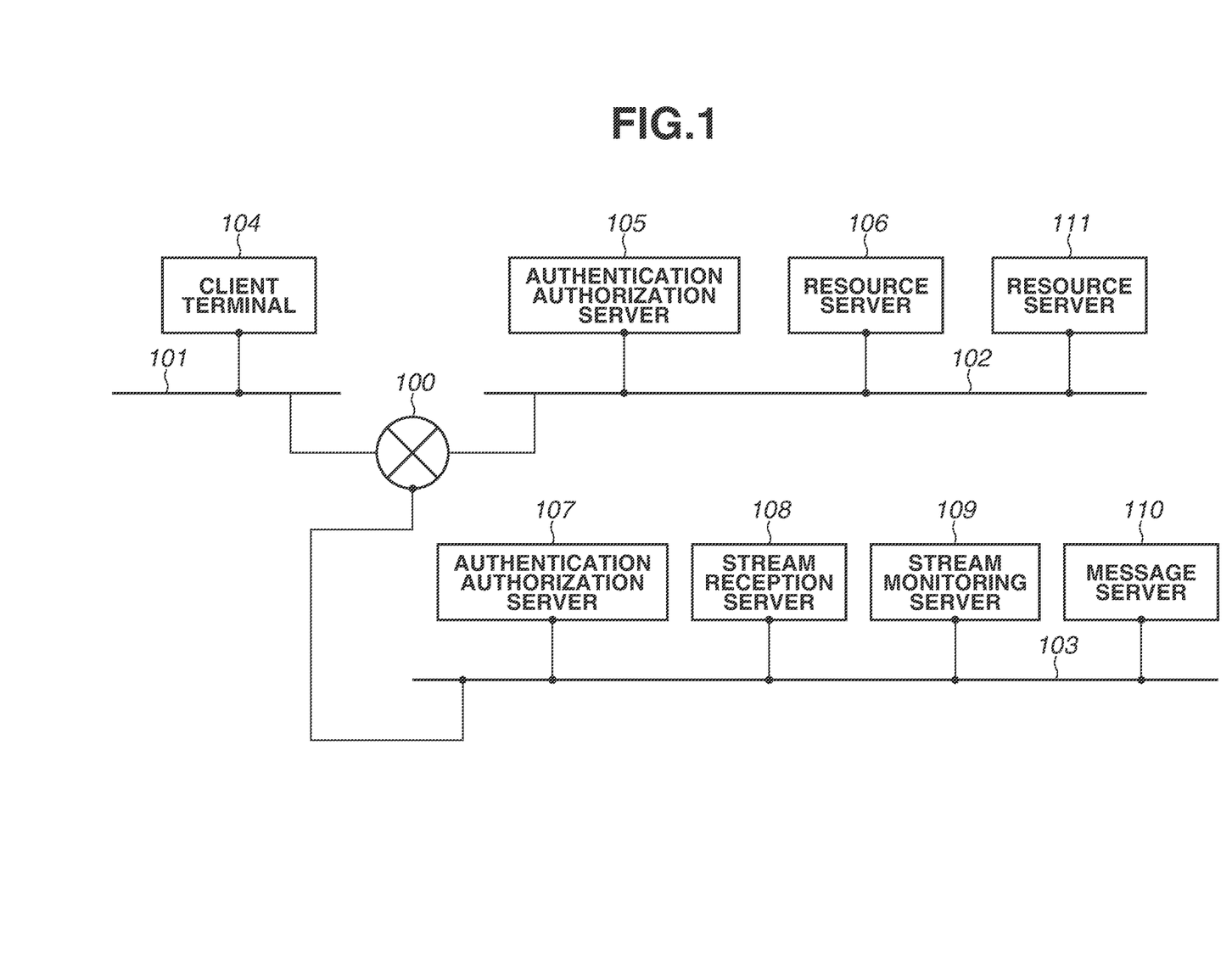
FIG. 1 is an overall diagram illustrating a system according to an exemplary embodiment of the present disclosure.

FIG. 1 is a diagram illustrating an overall configuration of a data collection base system as an information processing system according to the present exemplary embodiment. The information processing system according to the present exemplary embodiment includes a reception service system that receives data of a client terminal and a plurality of resource service systems that processes the received data and provides services. The reception service system and each of the resource service systems perform data processing in asynchronization with each other. Examples of services provided by the information processing system according to the present exemplary embodiment include a service to back up the data of the client terminal, and a service to analyze an operation state from information on a sensor connected to the client terminal.

A network 100 is a wide area network (hereinafter, referred to as WAN) that connects components of this system.

Networks 101, 102, and 103 are local area networks (hereinafter, referred to as LANs) that connect the components of this system.

A client terminal 104 is an apparatus for using the service, such as a personal computer, a mobile terminal, and an image forming apparatus.

An authentication authorization server 105 is a server for implementing authentication/authorization necessary for the client terminal 104 to use the service. The authentication authorization server 105 controls access of the client terminal 104 to resource servers 106 and 111.

The resource servers 106 and 111 are servers providing various services to the client terminal 104. The resource server 106 provides, for example, a service to back up data of the client terminal 104, and a service to analyze information on a sensor connected to the client terminal 104.

An authentication authorization server 107 is a server different from the authentication authorization server 105, and implements authentication/authorization for a stream reception server 108, a stream monitoring server 109, and a message server 110, and controls access.

The stream reception server 108 is a server that continuously receives stream data, and receives stream data transmitted by the client terminal 104.

The stream monitoring server 109 periodically checks a data reception state of the stream reception server 108. When the stream monitoring server 109 detects that the stream reception server 108 has received the data, the stream monitoring server 109 transfers the received data to the message server 110.

The message server 110 notifies a message generated by the client terminal and each of the servers included in the system. Here, the message indicates data to be processed by the resource servers 106 and 111. The message server 110 provides push notification of the message generated by any of the components of the system, to a registered notification destination, based on the registered notification destination and a notification condition.

In the present exemplary embodiment, the reception service system that receives data from a client includes the stream reception server 108, the stream monitoring server 109, and the message server 110. Each of the resource servers 106 and 111 functions as a resource service system that processes the data of the client to provide the service. In the present exemplary embodiment, each of the client terminal 104 and the servers 105 to 111 is illustrated as a single apparatus; however, each of the client terminal 104 and the servers 105 to 111 may include a plurality of apparatuses.

Figure 2:
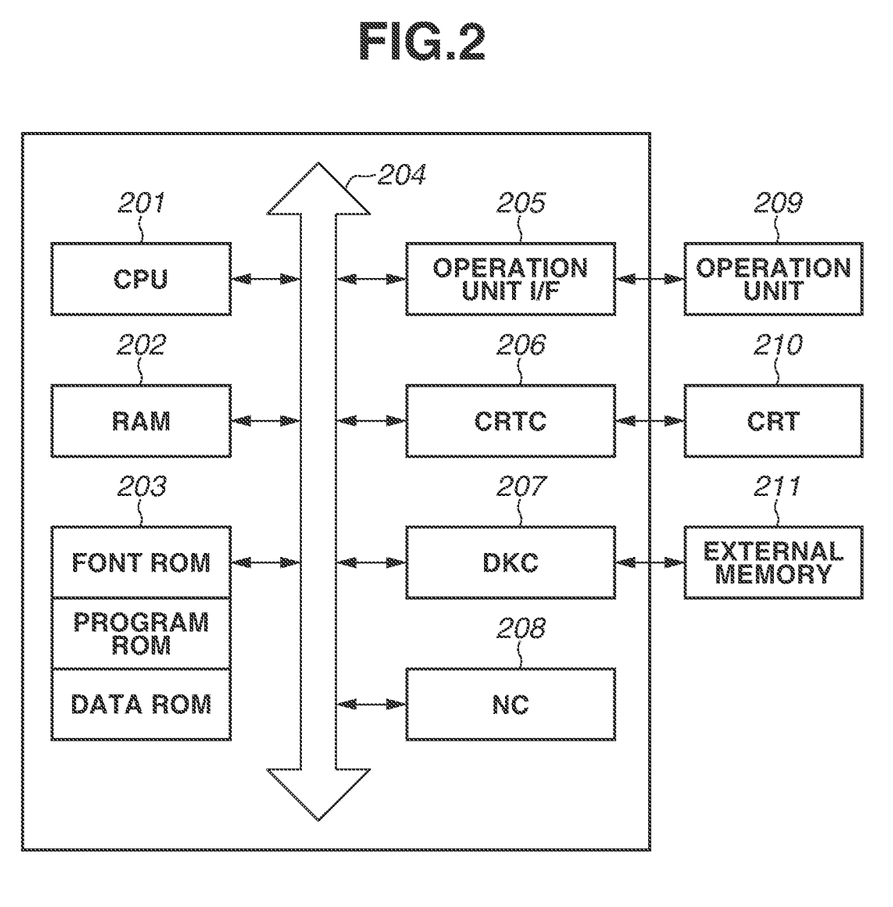
FIG. 2 is a hardware configuration diagram.

FIG. 2 illustrates a common hardware configuration of an information processing apparatus that includes the client terminal 104, the authentication authorization servers 105 and 107, the resource servers 106 and 111, the stream reception server 108, the stream monitoring server 109, and the message server 110. As for the resource servers 106 and 111, the functions of the hardware illustrated in FIG. 2 are implemented as application software by virtual machine software, and operate in a manner similar to a physical hardware element. A similar configuration applies for the authentication authorization servers 105 and 107, the stream reception server 108, the stream monitoring server 109, and the message server 110.

A central processing unit (CPU) 201 executes programs, such as an operating system (hereinafter, referred to as OS), and an application that are stored in a program read-only memory (ROM) as a ROM 203 or are loaded from an external memory 211, such as a hard disk, to a random access memory (RAM) 202. The CPU 201 controls blocks connected to a system bus 204. Processing in each of sequences described below is implemented by the program executed by the CPU 201.

The RAM 202 functions as a main memory, a work area, etc. for the CPU 201.

An operation unit interface (I/F) 205 controls input from an operation unit 209.

A cathode-ray tube controller (CRTC) 206 controls display of a CRT display 210.

A disk controller (DKC) 207 controls data access in the external memory 211 that stores various types of data, such as a hard disk.

A network controller (NC) 208 performs communication control processing with a sever and the other apparatuses connected via the network (WAN) 100 or the LAN 101, 102, or 103.

In the whole of the following description, an execution subject on the hardware is the CPU 201, and a subject on the software is an application program installed in the external memory 211, unless otherwise noted.

FIGS. 3A, 3B, 3C, 3D, 3E, 3F, and 3G are diagrams illustrating software configurations of the client terminal 104, the authentication authorization server 105, the resource servers 106 and 111, the authentication authorization server 107, the stream reception server 108, the stream monitoring server 109, and the message server 110, respectively. The functions are implemented by the respective modules being executed. Configurations illustrated in FIGS. 3A, 3B, 3C, 3D, 3E, 3F, and 3G partially include a hardware configuration.

Figure 3A:
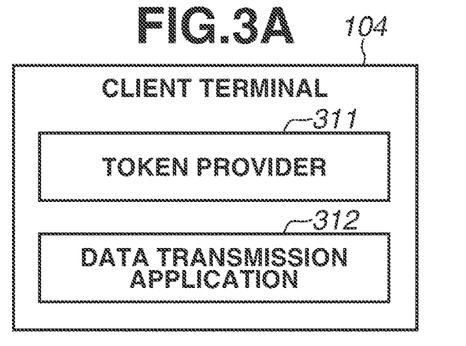
FIGS. 3A, 3B, 3C, 3D, 3E, 3F, and 3G are software configuration diagrams.

The client terminal 104 illustrated in FIG. 3A includes a token provider 311 and a data transmission application 312.

The token provider 311 performs authentication request of the client terminal 104 and an issuing request and acquisition of an access token for the authentication authorization server 105. The data transmission application 312 uses the services provided by the resource servers 106 and 111, and transmits data of the client terminal 104 to the stream reception server 108.

Figure 3B:
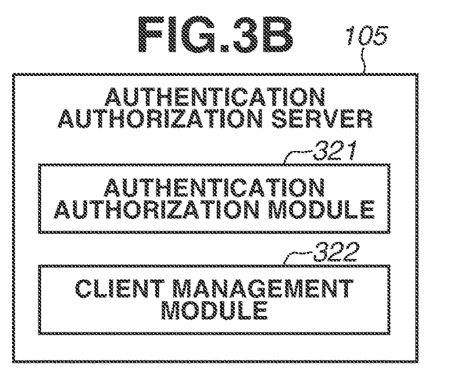

The authentication authorization server 105 illustrated in FIG. 3B includes an authentication authorization module 321 and a client management module 322.

The authentication authorization module 321 performs processing in response to the authentication request from the client terminal 104, and authorization processing of authorizing the authenticated client terminal 104. The client management module 322 manages the client terminal 104 having been subjected to the authentication processing and the authorization processing, and manages an identification (ID) of the client terminal 104 and information necessary for the authentication processing and the authorization processing.

Figure 3C:
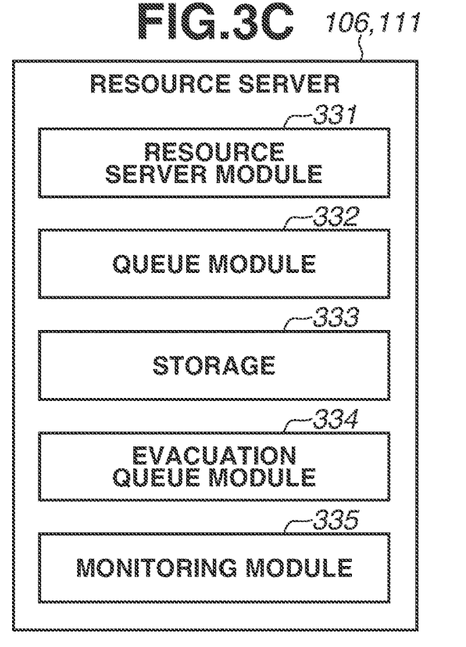

The resource servers 106 and 111 illustrated in FIG. 3C each include a resource server module 331, a queue module 332, a storage 333, an evacuation queue module 334, and a monitoring module 335.

The resource server module 331 registers resource server module 331 itself as a notification destination client in the message server 110 such that the message server 110 notifies the resource server module 331 of a message when the stream reception server 108 receives the data of the client terminal 104. The resource server module 331 acquires stream data accumulated in the queue modules 332 to implement various functions using the data. For example, the resource server module 331 persists the received stream data in the storage 333, or transmits notification to a different resource server when an optional value is included in contents of the received stream data. The resource server module 331 opens an application programmable interface (API) as a web service to the public, receives a request from the client terminal 104, and provides a service.

As described below with reference to FIG. 7, the resource server module 331 detects an abnormal state of the client terminal 104, and performs control to prevent the abnormal state from affecting data processing of the other client terminal.

The queue module 332 functions as a storage unit that receives the stream data via the message server 110 and stores the stream data. When the resource server module 331 registers the resource server module 331 itself as the notification destination client in the message server 110, the resource server module 331 receives the stream data via the message server 110 every time the client terminal 104 transmits data to the stream reception server 108. The received stream data is accumulated until the resource server module 331 instructs deletion.

The storage 333 persists the data processed by the resource server module 331. The evacuation queue module 334 and the monitoring module 335 are modules started up by the resource server module 331, and each store a message relating to a specific client. The detail thereof will be described below with reference to FIG. 7.

The functions of the resource server module 331 and the monitoring module 335 may be implemented by an event-driven computing service. A cloud computing service provides a service to execute light processing in response to an event occurred with respect to a specific computing resource. Such a service is called a serverless technology in which hardware is shared by function units to further enhance use efficiency of a server. When the serverless service is used, the cost can be reduced as compared with a case where a resident service is constructed and implemented. Specific examples of the service include Amazon Web Service (AWS) Lambda, Google Cloud Functions, and Microsoft Azure Functions.

In these services, a program code to implement desired processing is previously registered in the cloud computing service with the specification of a CPU, a memory, etc. of a virtual machine executing the program code being specified. The registered program code is associated with a computing resource and a specific event occurring with respect to the computing resource.

Referring back to FIGS. 3A, 3B, 3C, 3D, 3E, 3F, and 3G, the authentication authorization server 105 manages a client ID for unique identification of the client, a public ley for authentication of the client, and a device serial for unique identification of the client terminal 104 as illustrated in a client management table of Table 1.

The authentication authorization module 321 authenticates the client terminal 104 based on the client ID and the public key, and specifies the device serial of the client terminal 104.

TABLE 1

Client Management Table (Authentication Authorization Server 105)

| Client ID | Public Key | Device Serial |
|---|---|---|
| client1 | publickey1 | 123456789 |
| client2 | publickey2 | 987654321 |

The token provider 311 of the client terminal 104 holds the client ID and a private key for the own terminal as illustrated in a client management table of Table 2.

TABLE 2

Client Management Table (Client Terminal 104)

| client ID | Private Key |
|---|---|
| client1 | privatekey1 |

The present exemplary embodiment is described on the premise of authentication using the client ID and asymmetric keys; however, the authentication method is not particularly limited as described above, and the other method, such as authentication using the client ID and secret, may be used.

The method for registering the client ID and the private key in the client terminal 104 includes a method for dynamically registering the client ID and the private key at start of use of the client terminal 104 and a method for previously registering the client ID and the private key. For example, in a case of dynamically registering the client ID and the private key, the client terminal 104 holds secret information. When the secret information is requested to the authentication authorization server 105, the client ID and the asymmetric key are dynamically generated. The client terminal 104 acquires the client ID and the private key generated by the authentication authorization server 105, as a response, and manages the client ID and the private key in the client management table.

Figure 3D:
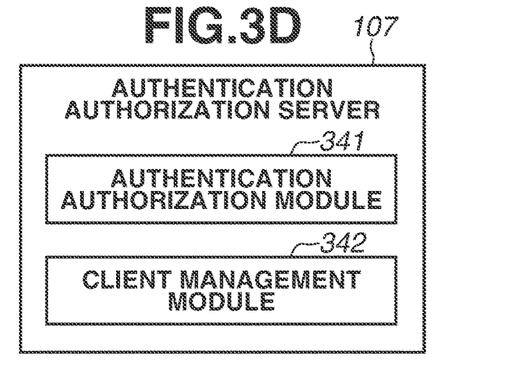

The authentication authorization server 107 illustrated in FIG. 3D manages the client ID for unique identification of the client and the secret for authentication of the client as illustrated in a client management table of Table 3. An authentication authorization module 341 authenticates the client terminal 104 based on the information.

TABLE 3

Client Management Table (Authentication Authorization Server 107)

| Client ID | Secret |
|---|---|
| clientA | secretA |
| clientB | secretB |

The resource server modules 331 of each of the resource servers 106 and 111 holds the client ID and the secret of the client, the authentication of which is to be controlled, as illustrated in a client management table of Table 4.

TABLE 4

Client Management Table (Resource Servers 106 And 111)

| Client ID | Secret |
|---|---|
| clientA | secretA |

Figure 3E:
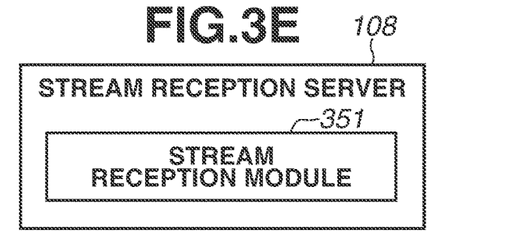

The stream reception server 108 illustrated in FIG. 3E includes a stream reception module 351. The stream reception module 351 receives stream data from the client terminal 104.

Figure 4:
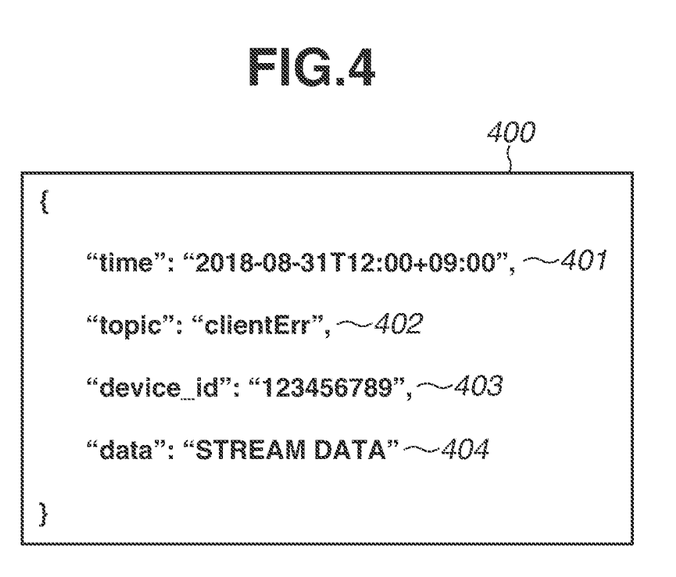
FIG. 4 illustrates an example of stream data to be transmitted to a stream reception server by a client terminal.

FIG. 4 illustrates an example of the stream data. Stream data 400 includes a data generation time 401, a topic ID 402, a client terminal ID 403, and an element of data 404.

The data generation time 401 stores a time when the client terminal 104 has generated the data. In the present exemplary embodiment, the date is represented in an International Organization for standardization (ISO) 8601 standard format; however, the representation rule is not limited. The topic ID 402 stores an ID to specify a topic relating to the data generated by the client terminal 104. The client terminal ID 403 stores a device serial for unique specification of the client terminal having generated the stream data. The data 404 stores real data.

Figure 3F:
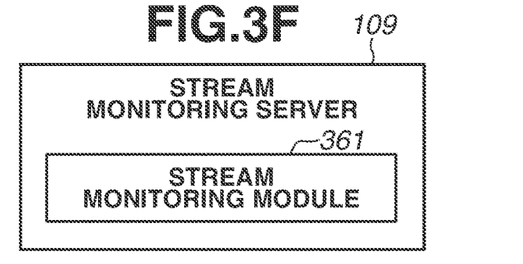

The stream monitoring server 109 includes a stream monitoring module 361.

The stream monitoring module 361 periodically monitors whether the stream reception server 108 has received the stream data from the client terminal 104. In response to detecting that the stream reception server 108 has received the stream data, the stream monitoring module 361 acquires the stream data from the stream reception server 108. The stream monitoring module 361 checks the topic ID 402 from the acquired stream data, and transfers, to the message server 110, the stream data in association with the topic ID 402.

Figure 3G:
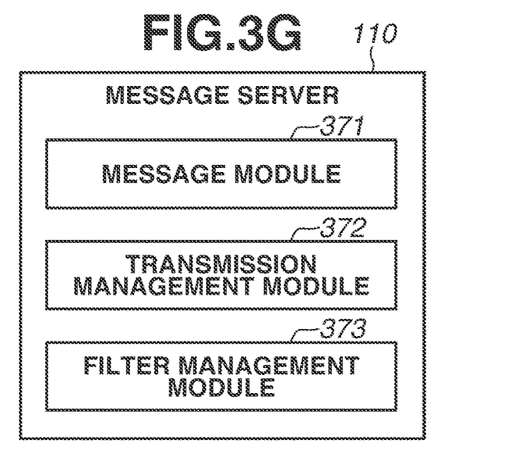

The message server 110 illustrated in FIG. 3G includes a message module 371, a transmission management module 372, and a filter management module 373.

The message module 371 receives the stream data via the stream monitoring server 109. The message module 371 notifies the client of the received stream data based on notification destination client information managed by the transmission management module 372.

The transmission management module 372 manages a notification destination client of the data received by the message module 371.

The filter management module 373 is used for controlling a message notification method for each client that is set as the notification destination client in the transmission management module 372. More specifically, when each of the resource servers 106 and 111 detects abnormality of the client terminal 104, the filter management module 373 is used to control the notification method of the stream data transmitted from the client terminal 104 in an abnormal state, for each of the resource servers 106 and 111. The detail thereof will be described below with reference to FIG. 7.

The processing which is performed by the client terminal 104 to transmit the data to the stream reception server 108 and the processing which is performed by the resource servers 106 and 111 to acquire the data from the stream reception server 108 via the message server 110 to use the data will be described with reference to FIG. 5 and FIG. 6.

Figure 5:
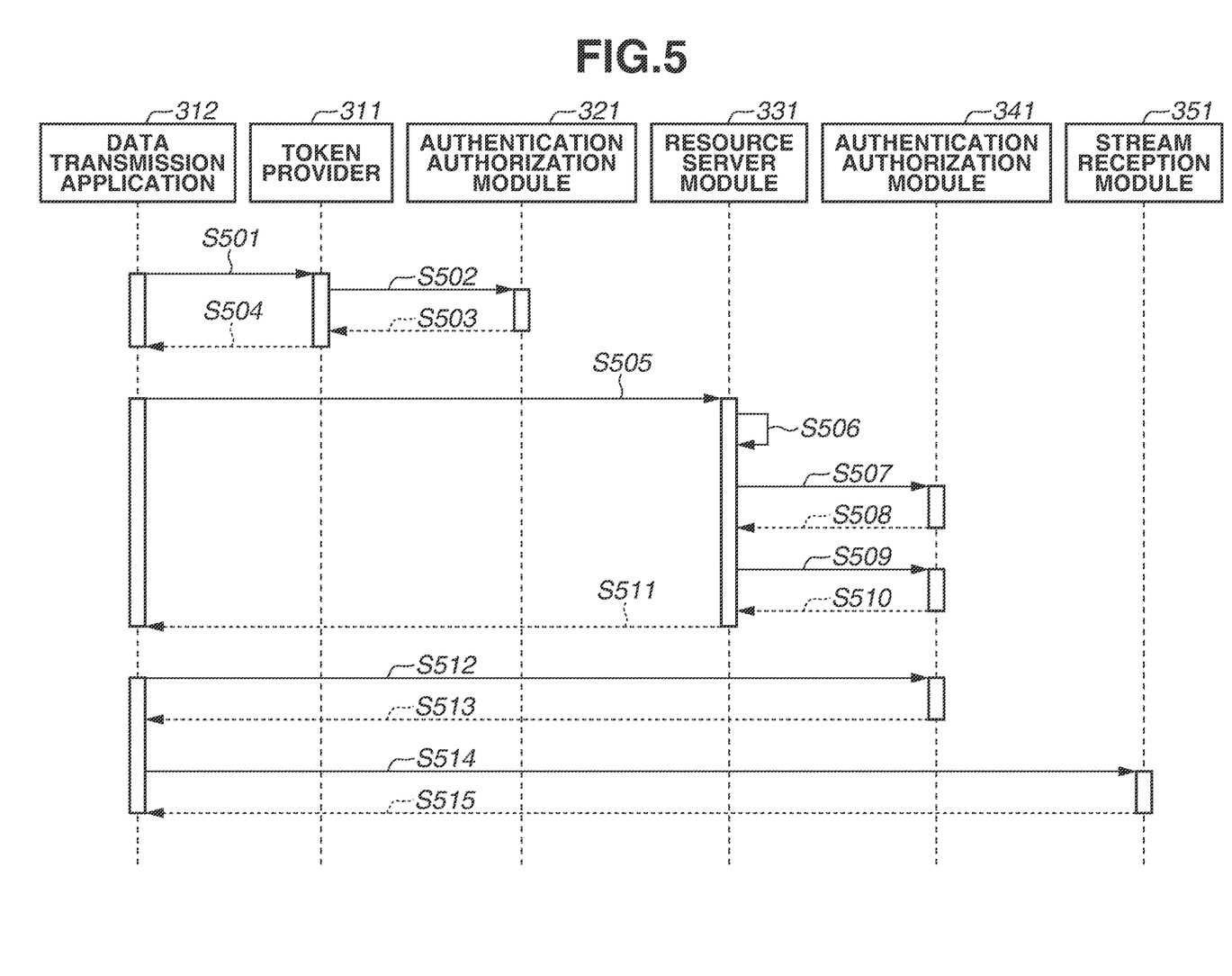
FIG. 5 is a sequence diagram of processing which is performed by the client terminal to transmit data to the stream reception server.

FIG. 5 is a sequence diagram illustrating the processing which is performed by the client terminal 104 to transmit the data to the stream reception server 108.

In step S501, the data transmission application 312 of the client terminal 104 transmits a token issuance request to the token provider 311. The token provider 311 uses the client ID and the private key managed in Table 2 to create assertion, and generates a token issuance request with the assertion. In the present exemplary embodiment, the assertion is assumed to be JSON Web Token (hereinafter, referred to as JWT) that is defined by Request for Comments (RFC) 7519, and JWT includes information such as the client ID.

In step S502, the token provider 311 transmits the assertion to the authentication authorization module 321 of the authentication authorization server 105.

The authentication authorization module 321 acquires the public key corresponding to the client terminal that has transmitted the assertion in step S502, from Table 1, and performs signature verification of the assertion. In a case where the verification is successful, the authentication authorization module 321 issues an access token A1, and transmits the access token A1 as a response in step S503. The token provider 311 that has received the response transmits the access token A1 to the data transmission application 312 as a response in step S504. The access token A1 is used for the client terminal 104 to access the resource servers 106 and 111, access to which is controlled by the authentication authorization server 105.

In the present exemplary embodiment, the access token is assumed to be the JWT, and includes information, such as the client ID and the device serial of the client terminal 104, and an expiration date of the token.

In step S505, the data transmission application 312 uses the access token A1 received in step S504, to transmit a token issuance request to the resource server module 331 of the resource server 106.

In step S506, the resource server module 331 verifies the access token A1 included in the received token issuance request. The resource server module 331 holds the public key to verify the JWT issued by the authentication authorization module 321, and authorizes the client by verifying the JWT. In the verification of the JWT, the resource server module 331 uses the public key to verify whether the signature of the JWT is valid, and further verifies whether the JWT is within a valid period. As a result of verification of the access token A1, the client information can be acquired, and the client terminal 104 as the access source can be identified with the device serial. Alternatively, the resource server module 331 may request the authentication authorization module 321 to verify the token, and may acquire a result of the verification and the client information. The resource server module 331 having received the request performs processing with respect to a request received in each of steps S507 and S509.

In step S507, the resource server module 331 transmits a token issuance request to the authentication authorization module 341 of the authentication authorization server 107.

The token issuance request is transmitted together with the client ID and the secret in Table 4. In a case where the client ID and the secret managed in Table 3 are coincident with the client ID and the secret included in the token issuance request, the authentication authorization module 341 having received the token issuance request issues an access token B and transmits the access token B as a response in step S508. The access token B is used for accessing to the authentication authorization server 107.

In step S509, the resource server module 331 having acquired the access token B transmits an ID token issuance request to the authentication authorization module 341. In the ID token issuance request, the resource server module 331 transmits the access token B and the client ID of the client terminal 104 acquired from the result of the verification in step S506. In step S510, the authentication authorization module 341 issues an ID token for the received client ID. The resource server module 331 having received the response transmits the ID token to the data transmission application 312 as a response in step S511.

The ID token is used for certifying that the client terminal 104 has been surely authenticated. In the present exemplary embodiment, the resource server module 331 checks authentication of the client terminal 104 by verifying the access token A1 in step S506. The authentication authorization module 341 establishes trust relationship with the resource server module 331 by providing the client ID and the secret to the resource server module 331, and trusts a result of the resource server module 331 having authenticated the client terminal 104. The authentication authorization module 341 issues the ID token based on the trust. The ID token is assumed to be in the JWT format, and the authentication authorization module 321 can verify the ID token by verifying the signature.

In step S512, the data transmission application 312 of the client terminal 104 having received the ID token transmits a token issuance request to the authentication authorization module 341 of the authentication authorization server 107. The request includes the ID token acquired in step S511. In step S513, the authentication authorization module 341 having received the request verifies the ID token, and issues and transmits an access token C as a response. The access token C is used for accessing to the stream reception server 108 and the message server 110.

In step S514, the data transmission application 312 of the client terminal 104 having received the access token C transmits data to the stream reception module 351 of the stream reception server 108. In this data transmission, the access token C and the access token A1 are transmitted. The stream reception module 351 having received the data verifies the access token C. In a case where there is no problem, the stream reception module 351 holds a pair of the access token A1 and the data, and transmits a result as a response in step S515.

The client terminal 104 then completes the data transmission to the stream reception server 108.

Table 5 illustrates an example of the data held by the stream reception server 108 when the processing illustrated in FIG. 5 is completed. The ID for unique identification of the data, a reception date when the data has been received, and a set of the received access token, the received data, and the identification information are managed as one record, and sorted and stored in order of the reception date in the stream reception server 108.

These records are automatically deleted from a stream data holding table of Table 5 after a predetermined time has elapsed from reception. The stream data may be transferred to an external storage server before deletion. Cooperation with the external storage server will be described below in second exemplary embodiment.

TABLE 5

Stream Data Holding Table

| ID | Reception Date | Held Data |
|---|---|---|
| 1 | 2018/08/31 00:00:01 | Access token A1, data |
| 2 | 2018/08/31 00:00:02 | Access token A1, data |
| 3 | 2018/08/31 00:00:03 | Access token A1, data |

Figure 6:
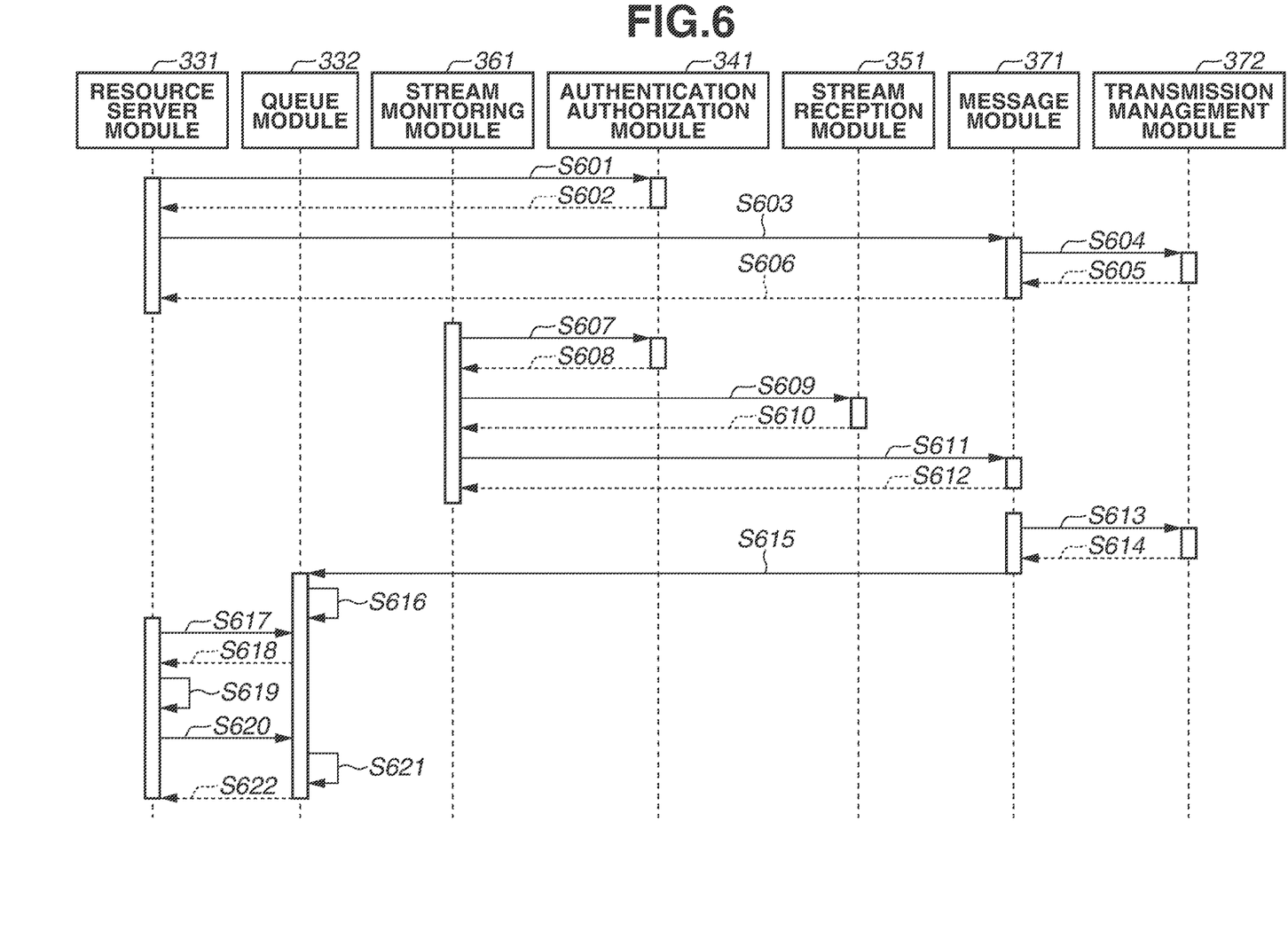
FIG. 6 is a sequence diagram of processing which is performed by a resource server to acquire data from the stream reception server via a message server.

FIG. 6 is a sequence diagram illustrating a series of processes in which each of the resource servers 106 and 111 acquires the stream data from the stream reception server 108, and performs processing to implement the services provided by the resource servers 106 and 111.

Processing in steps S601 to S606 is a series of processes to register the resource servers 106 and 111 as message notification destinations in the message server 110.

In step S601, the resource server module 331 of each of the resource servers 106 and 111 transmits a token issuance request to the authentication authorization server 107. The processing is similar to the processing in step S507. In step S602, the authentication authorization module 341 of the authentication authorization server 107 receives the token issuance request, issues an access token B necessary for accessing to the stream reception server 108, and transmits the access token B as a response to the resource server module 331.

In step S603, the resource server module 331 transmits, to the message server 110, a registration request to register the resource server module 331 as a notification destination when the client terminal 104 transmits data to the stream reception server 108. In the request transmission, the access token B, the client ID of each of the resource servers 106 and 111, a notification condition, etc. are transmitted together. In the present exemplary embodiment, the notification condition is topic information of interest to the resource servers 106 and 111 in the data transmitted by the client terminal 104. The message module 371 of the message server 110 verifies the access token B. When there is no problem, the message module 371 transfers the received registration request to the transmission management module 372.

In step S604, the transmission management module 372 stores information included in the received registration request of each of the resource servers 106 and 111. Table 6 illustrates an example of transmission management data held by the transmission management module 372.

TABLE 6

Transmission Management Data Table

| Topic ID | Notification Destination Client ID |
|---|---|
| clientErr | resourcesrv106, resourcesrv111 |
| clientEvent | resourcesrv106 |

The transmission management data including the topic ID for identification of a type of the stream data and the client ID as a notification destination of the message in association with each other is stored as one record.

In step S605, the transmission management module 372 notifies the message module 371 of storage of the transmission management data, as a response. In step S606, the message module 371 having received the response transmits, as a response, a result to the resource server module 331.

Processing in steps S607 to S616 is a series of processes to notify the resource servers 106 and 111 of the data transmitted from the client terminal 104 via the message server 110, as a message notification.

The processing in steps S607 and S608 is performed by the stream monitoring module 361 of the stream monitoring server 109 to transmit a token issuance request to the authentication authorization server 107, and is similar to the processing in steps S501 and S502. Thus, description of the processing is omitted.

In step S609, the stream monitoring module 361 checks whether the stream reception server 108 has received data from the client terminal 104. The processing in step S609 is performed at predetermined intervals. When the stream reception server 108 receives data from the client terminal 104, the stream reception module 351 transmits, as a response, the received data to the stream monitoring module 361 in step S610. The stream monitoring module 361 having received the data checks the topic ID from the received stream data. In step S611, the stream monitoring module 361 associates the topic ID with the stream data, and transmits the topic ID and the stream data to the message server 110. The message module 371 having received the topic ID and the stream data stores the topic ID and the stream data in association with each other, and transmits a result as a response in step S612. Table 7 illustrates an example of the data stored by the message module 371.

TABLE 7

| Message Table | |
|---|---|
| Topic ID | Message |
| clientErr | Stream data 400 |

The message module 371 stores, in the message table, the received topic ID and the received stream data in association with each other as one record.

In step S613, the message module 371 inquires of the transmission management module 372 whether the record corresponding to a value of the topic ID of the record stored in the message table is present in the transmission management data table. The transmission management module 372 checks the transmission management data table of Table 6, and transmits a result as a response in step S614.

In a case where the corresponding record is present in the transmission management data table of Table 6, the message module 371 checks, in step S615, the client ID of the transmission destination of the message acquired in step S614. The message module 371 transmits the stream data 400 as a message to the corresponding resource servers 106 and 111.

In step S616, the queue module 332 of each of the resource servers 106 and 111 having received the message from the message server 110 stores the received message.

Processing in steps S617 to S622 is a series of processes to implement the services provided by the resource servers 106 and 111. The operations in and after step S617 are asynchronously executed independently of the processing up to step S616.

In step S617, the resource server module 331 periodically inquires of the queue module 332 whether an unprocessed message is present. In a case where an unprocessed message is present, the queue module 332 transmits a message to the resource server module 331 in step S618.

In step S619, the resource server module 331 performs data processing based on the service to be provided, and stores the processed data in the storage 333. After the processing ends, in step S620, the resource server module 331 transmits a message deletion request to the queue module 332. In step S621, the queue module 332 having received the message deletion request deletes the corresponding message. In step S622, the queue module 332 transmits a result as a response to the resource server module 331.

A series of processes until each of the resource servers 106 and 111 processes the data transmitted from the client terminal 104 via the stream reception server 108 and the message server 110 is illustrated in FIG. 5 and FIG. 6. In this processing, the data transmission which is performed by the client terminal 104 and the data processing which is performed by the resource servers 106 and 111 to provide the services are asynchronously performed independently of each other. Accordingly, the client terminal 104 can transmit the data created by the client terminal 104 without waiting for the result of the data processing by the resource servers 106 and 111.

There may be a case where the client terminal 104 is in failure for some reason, and transmits, for example, a large amount of data relating to an error to the stream reception server 108. The processing to notify the message from the message server 110 to the resource servers 106 and 111 is performed every time the client terminal 104 transmits data. Thus, each of the resource servers 106 and 111 accumulates the large amount of data in the corresponding queue module 332. The resource server module 331 sequentially processes the message data accumulated in the queue module 332; however, the number of messages processable by the resource server module 331 per unit time is limited. Accordingly, when even one client terminal 104 that transmits a large amount of error data is present, the data processing of the client terminal 104 in a normal state is delayed.

In the present exemplary embodiment, processing when abnormality of the client terminal 104 is detected by the resource servers 106 and 111 and the client terminal 104 transmits abnormal data will be described with reference to FIG. 7 and FIG. 8.

Figure 7:
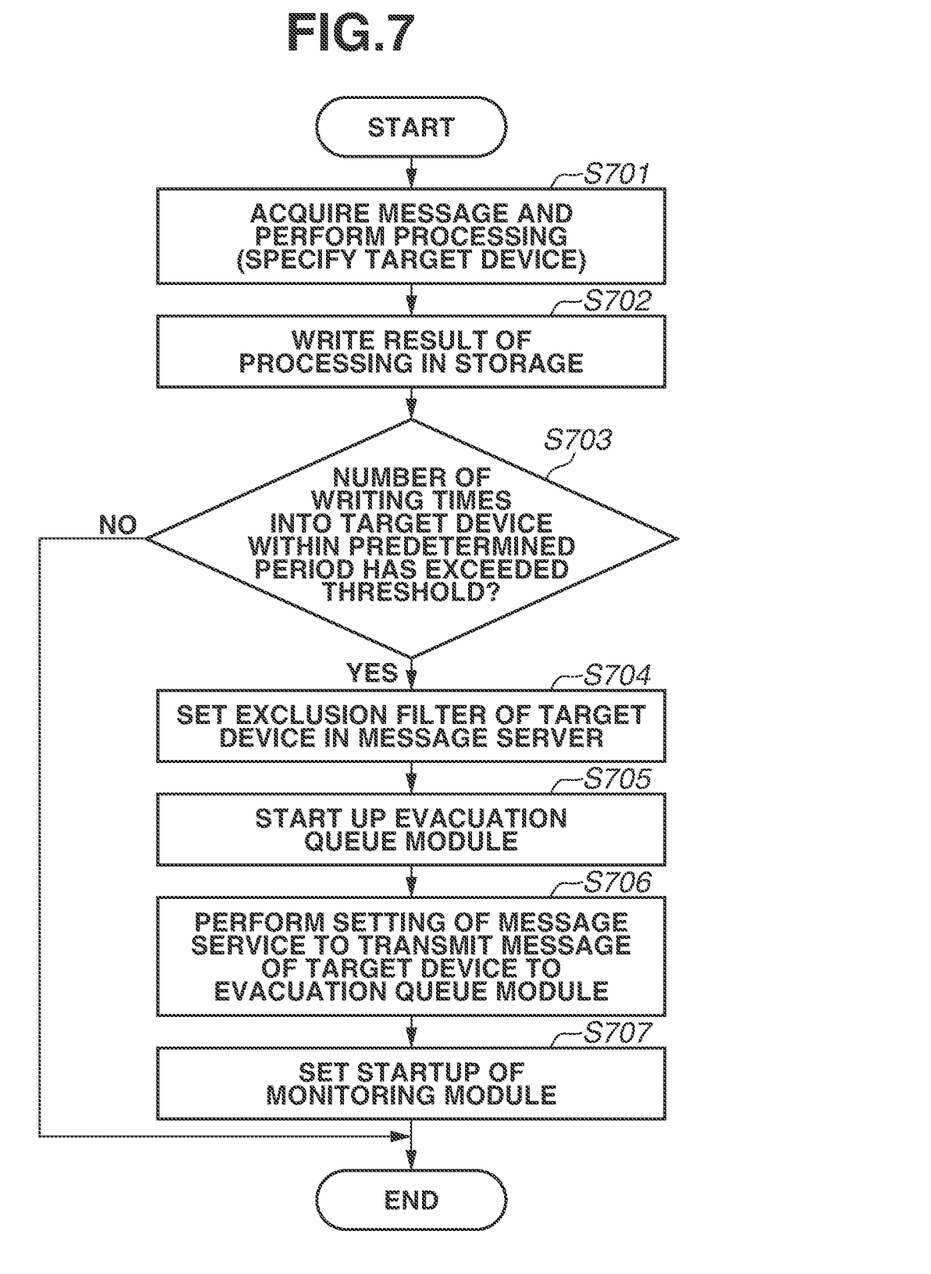
FIG. 7 is a flowchart of processing of detecting abnormality of the client terminal, which is performed by the resource server.

FIG. 7 is a detailed flowchart of processing in which the resource servers 106 and 111 detect abnormality of the client terminal 104 and process abnormal data in the processing in and after step S617 of FIG. 6. The flowchart illustrated in FIG. 7 represents the processing which is executed by the resource server module 331 of each of the resource servers 106 and 111. When the message reception from the queue module 332 is detected, the processing is started.

In step S701, the resource server module 331 acquires the message from the queue module 332 with use of the registered topic, and then performs data processing to provide the service based on the contents of the message. The resource server module 331 specifies the client terminal ID for unique identification of the client terminal 104 from the contents of the acquired stream data.

In step S702, the resource server module 331 stores the result of the processing in step S701, in the storage 333.

In step S703, the resource server module 331 checks whether the number of writing times, into the storage 333, relating to the client terminal ID specified in step S701 exceeds a threshold per unit time. In a case where the number of writing times exceeds the threshold (YES in step S703), the processing proceeds to step S704. The resource server module 331 performs operations in and after step S704. For example, the unit time used herein may be determined to 60 minutes from 13 o'clock to 14 o'clock, or may be determined to every 30 minutes from a time when data of a topic is first transmitted from the specific client terminal in one day.

The processing in step S703 is performed to determine whether the number of pieces of data transmitted from the message module 371 to the queue module 332 exceeds a predetermined number. In a case where the number of pieces of data transmitted from the message module 371 to the queue module 332 is lower than or equal to the predetermined number (NO in step S703), the processing in the flowchart of FIG. 7 ends.

In the present exemplary embodiment, the number of messages processed by the resource server module 331 per unit time is used for the determination. Alternatively, the number of messages stored in the queue module 332 may be used. The threshold to be used for the determination depends on the resource server because data processing capability is different among the resource servers.

In step S704, the resource server module 331 sets a filter to the filter management module 373 of the message server 110. More specifically, the resource server module 331 makes setting to exclude only data reception from the client terminal 104 specified in step S701. Even in the case where a large amount of data is transmitted from the client terminal 104 in an abnormal state, setting the exclusion filter makes it possible to avoid message notification from the message server 110 to the queue module 332. Table 8 illustrates an example of filter management data held by the filter management module 373 after the filter is set in step S704.

TABLE 8

Filter Management Data Table

| Topic ID | Notification Destination Client ID | Filter information |
|---|---|---|
| clientErr | resourcesrv106 | Reject data from device_id = 123456789 |

The filter management data including the topic ID for identification of the type of the stream data, the client ID as a notification destination of the message, and the filter information that are in association with one another is stored as one record. Table 8 illustrates an example in which the client terminal ID "123456789" specified in step S701 has been added as the client terminal 104 excluded from the message notification target.

In step S705, the resource server module 331 starts up the evacuation queue module 334. The evacuation queue module 334 is a queue module for detecting only data reception from the client terminal 104 excluded from the message notification target in step S704. The evacuation queue module 334 is started up for each client terminal 104. In a case where a plurality of client terminals 104 are determined to be in the abnormal state, the evacuation queue modules 334 of the same number as the number of client terminals 104 are started up. The process in step S706 is performed for each evacuation queue module 334. Thus, in the case where the plurality of client terminals 104 are determined to be in the abnormal state, the processing is performed for each evacuation queue module 334 corresponding to each of the plurality of client terminals 104.

In step S706, the resource server module 331 performs setting of the message server 110 to notify message to the evacuation queue module 334. More specifically, the resource server module 331 registers the evacuation queue module 334 in the transmission management module 372 of the message server 110, and sets a filter in the filter management module 373. Tables 9 and 10 respectively illustrate an example of the transmission management data held by the transmission management module 372 and an example of the filter management data held by the filter management module 373 after the message notification setting in step S706.

TABLE 9

Transmission Management Data Table

| Topic ID | Notification Destination Client ID |
|---|---|
| clientErr | resourcesrv106, resourcesrv111, resourcesrv106_evacuation_123456789 |
| clientEvent | resourcesrv106 |

As the notification destination client ID of the topic ID "clientErr", the client terminal ID "resourcesrv106_evacuation_123456789" of the evacuation queue module 334 is added.

TABLE 10

Filter Management Data Table

| Topic ID | Notification Destination Client ID | Filter Information |
|---|---|---|
| clientErr | resourcesrv106 | Reject data from device_id = 123456789 |
| clientErr | resourcesrv106_evacuation_123456789 | Only receive data from device_id = 123456789 |

As the filter of the message notified to the evacuation queue module 334, the filter information to notify only the data reception from the client terminal ID "123456789" specified in step S701 is added to the filter management data.

In step S707, the resource server module 331 sets startup of the monitoring module 335. The monitoring module 335 checks changes in the number of messages in the evacuation queue module 334 at predetermined intervals, and the check interval of the number of messages is set in step S707.

The above-described processing enables the resource servers 106 and 111 to detect abnormality of the client terminal 104 and exclude the abnormal data from the target of the normal data processing. The client terminal 104 in an abnormal state, however, does not continue transmission of the abnormal data. For example, in a case where the client terminal 104 transmits the abnormal data due to failure of the hard disk, the client terminal 104 transmits normal data after the hard disk is replaced. Even in the case of the abnormal data transmission due to the other cause, the cause is eventually specified and the client terminal 104 returns to the normal state. In the processing described with reference to FIG. 7, when the abnormal state is detected once by each of the resource servers 106 and 111, the data received from the client terminal 104 determined to be in the abnormal state is excluded from the processing target. A method for determining whether the client terminal 104 determined to be in an abnormal has returned to the normal state and returning the data to the processing target when the client terminal 104 has returned to the normal state will be described below with reference to FIG. 8.

When the startup of the monitoring module 335 is set in step S707, the monitoring module 335 is periodically started up based on the setting information. The flowchart illustrated in FIG. 8 illustrates the processing which is executed by the monitoring module 335 of each of the resource servers 106 and 111. In the case where a plurality of evacuation queue modules 334 is present, all of the evacuation queue modules 334 are to be processed.

In step S801, the monitoring module 335 checks the total number of messages of the evacuation queue module 334.

In step S802, the monitoring module 335 calculates a difference between the number of messages checked in step S801 and the total number of messages checked previous time, and checks whether an increment of the total number of messages becomes lower than or equal to a threshold. In a case where the increment of the total number of messages exceeds the threshold (NO in step S802), the processing proceeds to step S806, and the operation in step S806 is performed. In a case where the increment of the total number of messages is lower than or equal to the threshold (YES in step S802), the processing proceeds to step S803, and operations in and after step S803 are performed. The processing in step S802 is performed to check whether the client terminal 104 has returned to the normal state, by checking the number of pieces of data transmitted by the client terminal 104 within a predetermined period. In the case where the increment of the total number of messages exceeds the threshold, it is determined that the client terminal 104 is still in the abnormal state. In the case where the increment of the total number of messages is lower than or equal to the threshold, it is determined that the client terminal 104 has returned to the normal state, and process for returning the data to be transmitted from the client terminal 104 to the processing target is performed.

In step S803, the monitoring module 335 cancels the message notification setting to the evacuation queue module 334 set in step S706. More specifically, the monitoring module 335 deletes the filter setting relating to the evacuation queue module 334 from the filter management module 373 of the message server 110, and performs request to delete the evacuation queue module 334 from the notification destination client of the transmission management module 372.

Tables 11 and 12 respectively illustrate an example of the transmission management data held by the transmission management module 372 and an example of the filter management data held by the filter management module 373 after stoppage of the message notification is set in step S803.

In step S804, the monitoring module 335 deletes the evacuation queue module 334. At this time, the messages stored in the evacuation queue module 334 are also deleted.

In step S805, the monitoring module 335 deletes the exclusion filter setting of the client terminal 104 from the filter management module 373 of the message server 110.

In step S806, the monitoring module 335 checks whether an unchecked evacuation queue module 334 is present. In a case where an unchecked evacuation queue module 334 is present (YES in step S806), the processing returns to step S801, and operations in and after step S801 are performed on the unchecked evacuation queue module 334. In a case where no unchecked evacuation queue module 334 is present (NO in step S806), the monitoring module 335 performs processing in step S807.

In step S807, the monitoring module 335 checks whether the active evacuation queue module 334 is present. In a case where the active evacuation queue module 334 is present (NO in step S807), the processing ends. In a case where the active evacuation queue module 334 is absent (YES in step S807), the processing proceeds to step S808. In step S808, the startup setting of the monitoring module 335 that has been enabled in step S707 is disabled. As a result, the monitoring module 335 does not start up periodically.

The above-described processing makes it possible to detect that the client terminal 104 has returned from the abnormal state to the normal state, and to resume the normal data processing in a case where the client terminal 104 has returned to the normal state.

The mechanism for avoiding delay of the data processing for other clients in a case where a large amount of data is transmitted from the predetermined client terminal 104 has been described with reference to FIG. 7.

Further, the mechanism for resuming the data processing of the predetermined client terminal 104 in a case where it is determined that the amount of data transmitted from the predetermined client terminal 104 has returned to the normal state has been described with reference to FIG. 8.

As described above, in the present exemplary embodiment, in the case where the large amount of data is transmitted from the predetermined client terminal 104, the data from the client terminal 104 is stored in the evacuation queue. This makes it possible to avoid delay of the processing on the data from other clients stored in the queue module.

A second exemplary embodiment of the present disclosure will be described below. It has been described that, even in the case where the client terminal 104 transmits abnormal data, the resource servers 106 and 111 can provide the services to the normal client terminal 104 through the method described in the first exemplary embodiment.

In the method described in the first exemplary embodiment, however, the data transmitted from the client terminal 104 that has been determined as abnormal by the resource servers 106 and 111 is deleted as it is without being written to the storage 333 because the data is excluded from the data

TABLE 11

Transmission Management Data Table

| Topic ID | Notification Destination Client ID |
|---|---|
| clientErr | resourcesrv106, resourcesrv111, ~~resourcesrv106_evacuation_123456789~~ |
| clientEvent | resourcesrv106 |

TABLE 12

Filter Management Data Table

| Topic ID | Notification Destination Client ID | Filter Information |
|---|---|---|
| clientErr | resourcesrv106 | Reject data from device_id = 123456789 |
| ~~clientErr~~ | ~~resourcesrv106_evacuation_123456789~~ | ~~Only receive data from device_id = 123456789~~ | processing target. Thus, an issue may arise in a case where the abnormal data is referred for analysis later.

In the present exemplary embodiment, a method for holding data necessary to analyze later the state of the client terminal 104 fallen into the abnormal state will be described.

In the present exemplary embodiment, the stream data received by the stream reception server 108 is held by the external storage server, and the storage data held by the external storage server is referable.

Figure 8:
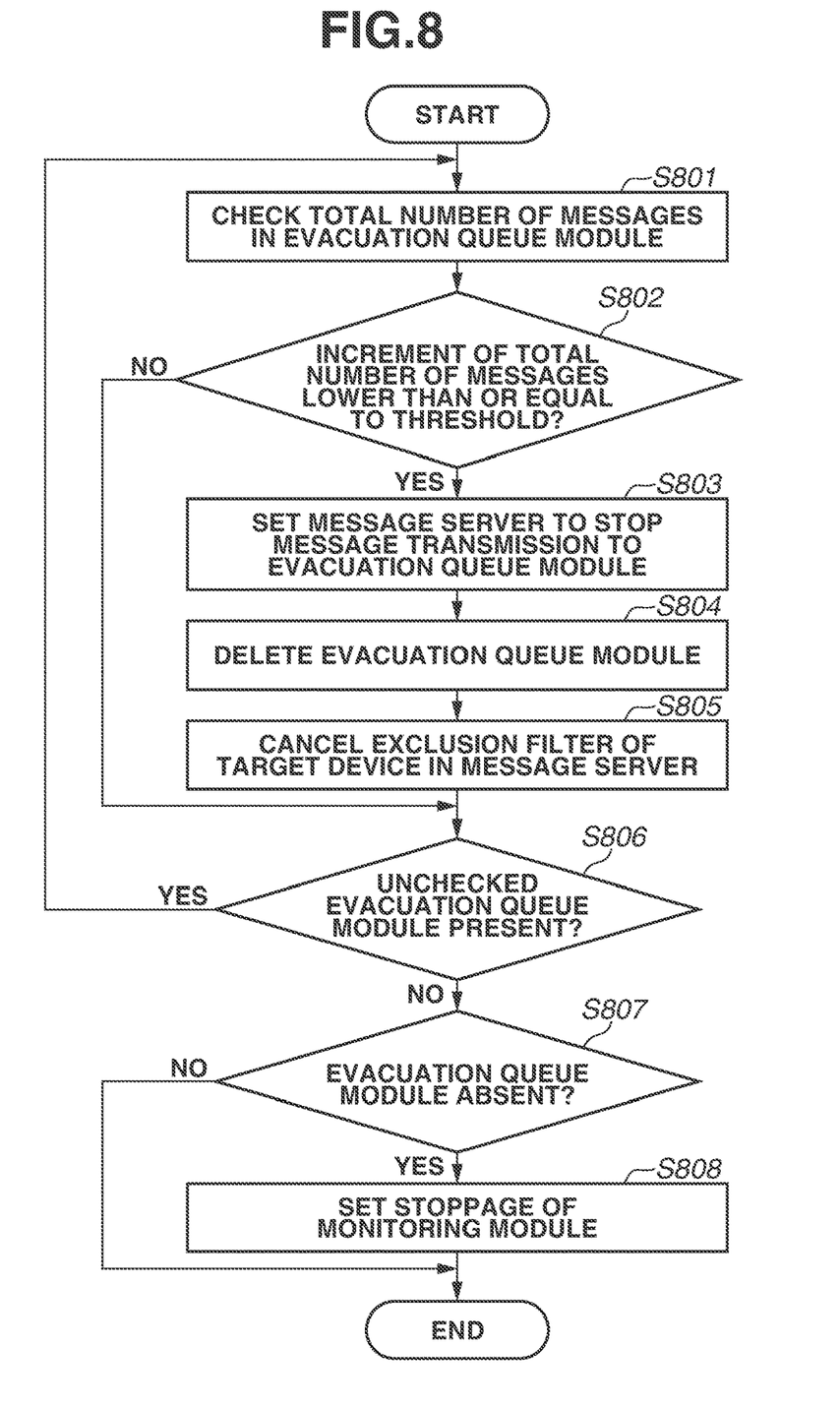
FIG. 8 is a flowchart of processing of ending processing of abnormal data, which is performed by the resource server.
Figure 9:
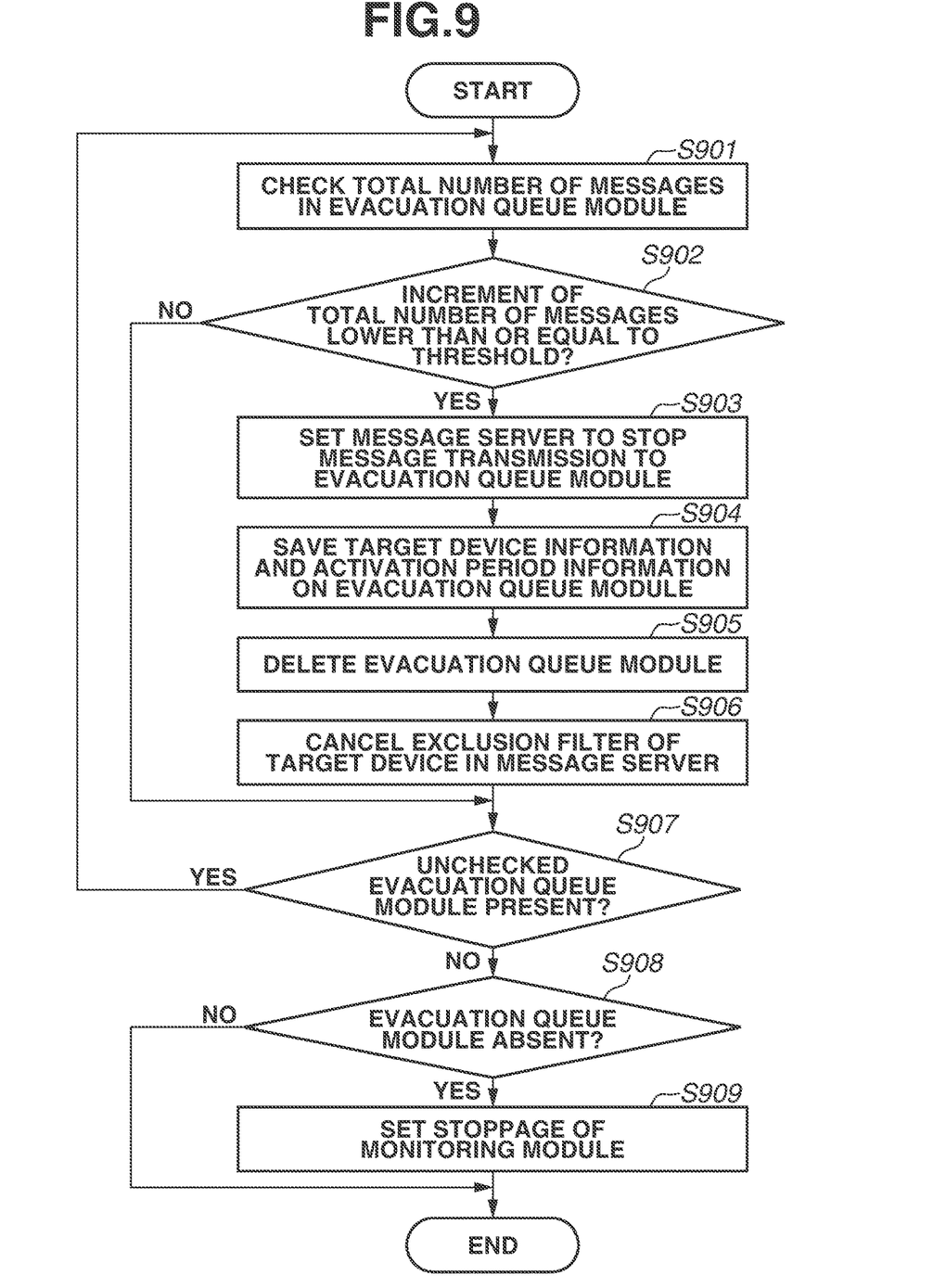
FIG. 9 is a flowchart of processing to store client terminal information when the resource server ends the processing of the abnormal data.

FIG. 9 is a detailed flowchart illustrating processing in the present exemplary embodiment. Operations in steps S901 to S903 are similar to those in steps S801 to S803 in FIG. 8 according to the first exemplary embodiment. Thus, descriptions thereof are omitted.

In step S904, the monitoring module 335 stores, in the storage 333, the client terminal ID specified in step S701 described in FIG. 7 according to the first exemplary embodiment, the startup time of the evacuation queue module 334 started up in step S705, and the current time. Table 13 illustrates an example of abnormal client terminal management data held by the storage 333.

TABLE 13

Abnormal Client Terminal Management Data Table

| Client Terminal ID | Start Date | End Date |
| --- | --- | --- |
| 123456789 | 2018-08-31T12:00+09:00 | 2018-09-05T12:00+09:00 |

In the abnormal client terminal management data table, the client terminal ID, the start date when operation of the evacuation queue module 334 is started, and the end date when the operation of the evacuation queue module 334 ends are stored in association with one another as one record. The evacuation queue module 334 is started up by the resource server module 331 when each of the resource servers 106 and 111 detects abnormality in the client terminal 104. The evacuation queue module 334 is deleted by the monitoring module 335 when each of the resource servers 106 and 111 detects elimination of the abnormality of the client terminal 104.

In the present exemplary embodiment, the date is represented in the ISO 8601 standard format; however, the representation rule is not limited.

Operations in steps S905 to S909 are similar to those in steps S804 to S808 in FIG. 8 according to the first exemplary embodiment. Thus, descriptions thereof are omitted.

As described above, in the present exemplary embodiment, the method in which each of the resource servers 106 and 111 holds the identification information about the client terminal 104 and information about the period during which the evacuation queue module 334 is active has been described. This can help analysis of the abnormal state of the client terminal 104 based on the abnormal data held by the storage server.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the present disclosure is not limited to the disclosed exemplary embodiments. The scope of the following claims is to be accorded the broadest interpretation so as to encompass all such modifications and equivalent structures and functions.

What is claimed is:

1. A resource service system that is one of a plurality of resource service systems, wherein each of the plurality of resource service systems is capable of communicating with a reception service system that receives data from a plurality of clients, the resource service system comprising:
one or more memories storing instructions; and
one or more processors executing the instructions to:
receive data transmitted from the reception service system; and
delete data of a predetermined client transmitted from the reception service system in a case where a number of pieces of data of the predetermined client transmitted from the reception service system per unit time exceeds a predetermined number.

2. The resource service system according to claim 1, wherein the one or more processors further execute the instructions to determine whether the number of pieces of data of the predetermined client transmitted from the reception service system per unit time exceeds the predetermined number.

3. The resource service system according to claim 1, wherein the one or more processors further execute the instructions to:
perform processing on the received data; and
store information related to the processing of the received data in a storage.

4. The resource service system according to claim 1, wherein the one or more processors further execute the instructions to determine whether the number of pieces of data of the predetermined client transmitted from the reception service system per unit time exceeds the predetermined number based on the information stored in a storage.

5. The resource service system according to claim 1, wherein the one or more processors further execute the instructions to delete data of the predetermined client transmitted from the reception service system without performing processing on the data in a case where it is determined that the number of pieces of data of the predetermined client transmitted from the reception service system per unit time exceeds the predetermined number.

6. The resource service system according to claim 1, wherein the one or more processors further execute the instructions to perform processing on data of the predetermined client transmitted from the reception service system in a case where it is determined that the number of pieces of data of the predetermined client transmitted from the reception service system per unit time does not exceed the predetermined number.

7. The resource service system according to claim 1, wherein the one or more processors further execute the instructions to:
    specify identification information from the received data; and
    store the specified identification information in a storage.

8. The resource service system according to claim 1, wherein the one or more processors further execute the instructions to:
    specify date information of the data from the received data; and
    store the specified date information in a storage.

9. A method for controlling a resource service system that is one of a plurality of resource service systems, wherein each of the plurality of resource service systems is capable of communicating with a reception service system that receives data from a plurality of clients, the method comprising:
    receiving data transmitted from the reception service system; and
    deleting data of a predetermined client transmitted from the reception service system in a case where a number of pieces of data of the predetermined client transmitted from the reception service system per unit time exceeds a predetermined number.

10. A non-transitory computer readable storage medium in which a computer program is stored, the computer program, when executed, causing a computer to execute a control method for a resource service system that is one of a plurality of resource service systems, wherein each of the plurality of resource service systems is capable of communicating with a reception service system that receives data from a plurality of clients, the control method comprising:
    receiving data transmitted from the reception service system; and
    deleting data of a predetermined client transmitted from the reception service system in a case where a number of pieces of data of the predetermined client transmitted from the reception service system per unit time exceeds a predetermined number.

\* \* \* \* \*